Oct. 6, 1936.                J. C. STIMSON                    2,056,491
                    APPARATUS FOR MAKING REFLECTORS
                         Filed May 20, 1932
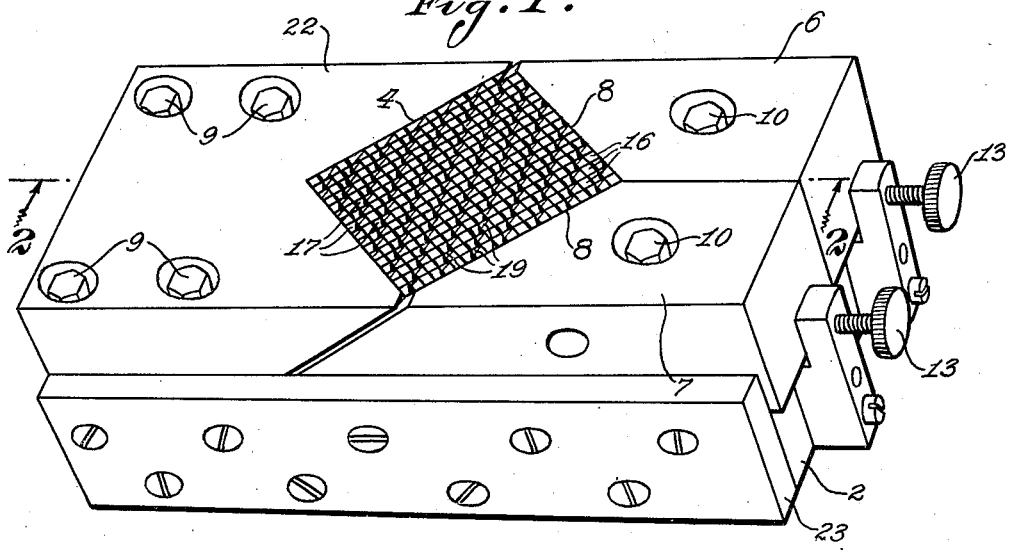
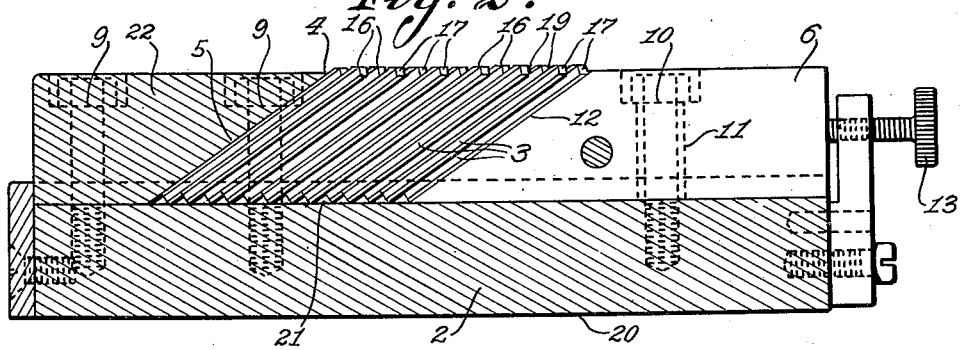
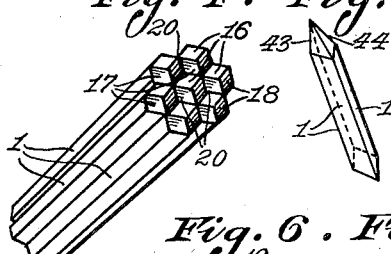
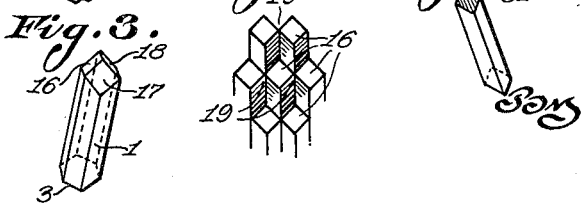
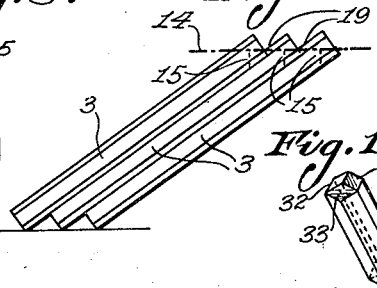
Inventor:
Jonathan C. Stimson,
John H. Bruninga
His Attorney.

Patented Oct. 6, 1936

2,056,491

UNITED STATES PATENT OFFICE 2,056,491

APPARATUS FOR MAKING REFLECTORS

Jonathan C. Stimson, Chicago, Ill.

Application May 20, 1932, Serial No. 612,455

7 Claims. (Cl. 51—217)

This invention relates generally to means for making elements designed for assembly in mutual engagement to present active cooperating faces, and more particularly to the finishing of a multiplicity of faces with accuracy to meet the varied requirements existing in the art of making multi-surface and/or multi-unit reflectors.

It is understood by those skilled in the lapping and polishing art, that the success of the operation is dependent, to a great extent, upon the area of the surface to be lapped, it being practically essential that the surface have a sufficient expanse to act as a guide and equalize the working pressure applied as a lap is moved thereacross or vice versa. However, as a limitation upon this principle, it is recognized that the surface must not be so large as to prevent the lap from freeing itself of the chips or end products of the operation, the tendency being for the lap to load with these products at the center so that accuracy is hindered or prevented unless the surface and tool are frequently washed. Accurate lapping of fair sized surfaces is a tedious operation requiring the services of highly skilled workmen and heretofore accurate flat lapping of surfaces in the order of one-eighth ($\frac{1}{8}$) or one-sixteenth ($\frac{1}{16}$) inch square has been regarded as practically impossible.

In the preparation of the mold elements for a matrix such as described in my prior Patent No. 1,591,572, July 6, 1926 concerning a process and apparatus for making pressed glass reflectors, these difficulties have been encountered. The difficulties have been especially noticeable since the elements require almost perfectly flat, highly polished operating or molding faces, in extremely accurate angular relation not only with each other but with the locating faces; otherwise the reflectors produced may be defective. It is recognized that the requisite flatness and polish of these operating or molding surfaces cannot be attained with the usual machine tools and grinders. Streams of fine lines are produced on the surfaces by the grains of abrasive in the grinder and slight unavoidable vibration of the machines produces minute undulations which generally run at about right angles to the streams of lines. The resultant surfaces are, therefore, usually unfit for use in reflector forming matrices, and must be further refined by lapping.

The fixtures heretofore available for holding a number of the elements during the machining operations do not lend themselves to the lapping operation, and consequently the reflector forming surfaces have been individually polished or lapped by hand or with the aid of some improvised guiding fixture on an appropriately charged flat lapping plate until the fine parallel lines and undulations are removed. The difficulties of accurately lapping small surfaces were pointed out above and because of these difficulties it has been necessary in the manufacture of pressed glass reflectors in accordance with my above mentioned patent, to use molding elements with much larger operating surfaces than is often desirable.

In the present invention, the general object is to provide improved means supporting forming elements for finishing relatively small surfaces thereof having all or part of the required characteristics described above.

A more particular object is to provide means for finishing surfaces of elements having these required characteristics whereby a hand lapping operation may be performed upon a number of surfaces.

Another object of this invention is to provide a means for simultaneously finishing a number of surfaces whereby these surfaces provide a sufficient guide for the equalized application of lapping pressure; and whereby, in some embodiments, the lapping operation will secure the required polish with much greater facility and flatness than would be possible with a single surface of equal expanse.

It is obvious in the production of large numbers of carefully formed elements having surfaces such as those required for the mold elements of my aforementioned patent that the number of times it is necessary to handle and adjust the element in appropriate fixtures for the successive operations is of importance. Still another object of the present invention is, therefore, to provide means minimizing the number of handling operations whereby the surface of an element is completed through the various necessary stages of production without rehandling or readjusting the element as a unit.

One of the particular characteristics of the elements required for molds constructed in accordance with my patent above referred to is that the formation of a precisely flat, highly polished and otherwise perfect operating surface is of no avail unless it is so accurately related as to angle with all of the locating surfaces of the element considered as a unit, that said forming surface on one element will finally assemble in accurate angular relation with forming surfaces of adjacent elements when the elements are finally tightly bound together with their series of locating surfaces in contact. It is of great importance, therefore, that the locating faces be formed with a uniformly high degree of accuracy and precision, both as to dimensions and angular relations. The elements under consideration may be and usually are very small in cross section as compared to over-all length, so that minute inaccuracies in dimensions and angular relation of individual locating faces would be very considerable if transmitted into angular inaccuracy of reflector forming faces. If, however, all of the locating faces of a group of elements contribute to the positioning of each element of the group, slight inaccuracies will become compensating. Since each locating face of every element (except the exterior faces of marginal elements) contributes to the final position of each element in a matrix assembly, the effect of such slight inaccuracies may be substantially overcome by utilizing every individual locating face as a positioning factor during the surfacing operations. Furthermore, measurable angular inaccuracy of the reflector forming surfaces will always exist and is in fact desirable and even necessary, but such inaccuracy must be kept within definite limits.

Still another object of the invention, therefore, is to provide an apparatus for finishing a multiplicity of surfaces upon a group of elements wherein the same factors of location are utilized in the surfacing operation which are later employed in the permanent assembly of the elements.

Other objects will become apparent to those skilled in the art when the following description is read in connection with the accompanying drawing illustrating an embodiment of the invention adapted particularly for the preparation of forming surfaces of elements shown and described in the above mentioned patent, and in which:

Figure 1 is a perspective view of an apparatus for retaining a group of elements in position for treatment.

Figure 2 is a sectional view taken along line 2—2 of Figure 1.

Figure 3 is a perspective view of one type of element to be processed.

Figure 4 is a perspective view of a group of the elements of Figure 3 assembled together to form a part of a completed matrix.

Figure 5 is a view showing a group of the elements of Figure 3 in the rough and illustrating in dotted line the position of surfaces to be finished.

Figure 6 is a plan view showing the surface arrangement and alinement of the elements of Figure 4 when arranged in the apparatus of Figure 1 for final treatment.

Figure 7 is a perspective view of still another type of element.

Figure 8 is a perspective of a matrix assembly of three of the elements of Figure 7.

Figure 9 is a perspective view of another type of element.

Figure 10 is a perspective view of three of the elements of Figure 9 as assembled in a matrix to form the equivalent of the element of Figure 3.

Generally stated, in accordance with this invention, a group of elements each of which is to be provided with one or more operating faces adapted to cooperate with similar faces on adjacent elements, and each of which is provided with a plurality of locating faces may be assembled together with the locating faces in mutual engagement, and an operating face produced concurrently on each element of the group. The faces to be treated are presented in surface relation and finally finished in the desired angular relation to the locating faces. The surface in which the faces are presented may be interrupted or interspersed with a plurality of depressions to facilitate the achievement of uniformly accurate surfaces and to enable a polishing tool to free itself of its product. In Figure 3 is illustrated a mold element 3 which is a component part of a matrix for pressed glass reflectors constructed according to my aforementioned patent, and to the production of which the process of this invention is admirably adapted. This element 3 is of hexagonal cross section and is so formed that the six longitudinal faces 1 are each precisely flat, and mutually located at equal angles to each other throughout the entire length of the element. These faces 1 may for convenience be termed locating surfaces.

At one end of the element the operating or molding faces 16, 17 and 18 are to be formed. Each of these faces will be as nearly as possible at right angles to two similar surfaces of two contiguous elements when a group of the elements are assembled together as illustrated in Figure 4 to form a matrix. Therefore, the surfaces 16, 17 and 18 must make equal angles with the axis or theoretical center line of the element 3. As pointed out in my patent referred to, the angle between the central longitudinal axis of the element and each of the operating surfaces should be approximately 35 degrees, 16 minutes.

After the operating faces 16, 17, 18 have been finished, a plurality of these elements 3 may be assembled as illustrated in Figure 4 with each locating face engaging a locating face of a contiguous element. Operating surfaces 16, 17 and 18 of these different elements will cooperate to form three sided pits or depressions 20 in the matrix, Figure 4; each surface of the depression being flat, highly polished and in close approximation to right angular relationship with each of the other two surfaces of the pit or depression 20.

Referring now to Figures 1 and 2 there is illustrated a fixture for surfacing a group of the elements 3. A base element 2 of considerable rigidity is provided with two parallel, flat and preferably hardened surfaces 20 and 21. The surface 21 provides a stop for the lower ends of the elements 3, parallel to the cutting action of the surfacing tools employed, thus assuring the uniform length of the completed elements.

Upon the base 2 a block 22 is rigidly fixed by means of cap screws 9 and a pair of retaining rails 23 are on each side. The inner end of this block is provided with a recess 4, V-shaped in the embodiment illustrated in the drawing and comprising two flat intersecting clamping surfaces so disposed that their line of intersection 5 forms the desired angle, for instance, with the surface 21 of the base 2. In the embodiment illustrated the line 5 lies in a plane perpendicular to the surface 21.

Mounted upon the other end of the base 2 is a pair of complemental blocks 6 and 7, corresponding in thickness to the block 22. Each of the blocks 6, 7 is provided with a hole 11 adapted to receive a cap screw 10 threaded into base 2, and the holes 11 are elongated to permit adjustment of the blocks longitudinally of the base while laterally retained by rails 23. The blocks 6 and 7 are each provided with an inclined surface 8 so disposed that the angular relation thereof is converse to relation between the clamping surfaces of block 22. The inclined surfaces 8 together complement recess 4 and cooperate therewith to form a rhomboid recess into which may be assembled the desired number of the elements such as 3, to be finished. Adjusting screws 13 are provided for moving the blocks 6, 7 into clamping engagement with the assembled elements.

A suitable number of elements of approximately uniform length in the rough, may be loaded or nested into the rhomboid recess of the fixture and the blocks 6 and 7 moved inwardly by the adjusting screws 13 to clamp the entire load of elements as a solid group with each of the locating faces of each element contacting with a locating face of a contiguous element. All of the locating faces of the respective elements are thereby utilized in positioning the element for surfacing. It will be noted that, in this manner the same locating factors are employed as are employed in the matrix of final assembly, except that the group as a whole is placed at the proper angle for surfacing. (35° 16' with an element such as 3).

It will be understood, of course, that the marginal elements have some of their external locating faces in contact with the clamping surface fixture instead of in contact with other elements and to this extent a few of the elements do not wholly duplicate the factors of final assembly in a matrix. This is also true of the marginal elements of a matrix assembly itself and is an incidental limitation of the process which does not mitigate seriously against the advantages of the process as a whole.

The elements, are loaded, carefully so that their lower ends engage the surface 21. They arrange themselves in staggered rows interspersed with a series of pits or depressions 19, as the two views of the loaded fixture, Figures 1 and 2 show clearly.

Elements in the rough before treatment are disposed as shown in Figure 5. The line 14 indicates the level of the first surface as well as the later surfaces to be finished and the dotted lines 15 indicate the relative position of another operating face. The elements may be made long enough for stock to extend safely beyond the finishing levels 14 and 15 but should not be so long as to eliminate the depressions 19, the advantage of which will be described later. The surface to be formed may be roughed out on any suitable machine, which may be a grinder, to within a few thousandths of an inch of the level 14. The final machine work may then be performed preferably on a surface grinder, care being taken to reach the level 14, which forms a composite surface of faces 16, as flat, highly polished and free from fine lines and undulations as is conveniently possible to obtain. After washing to remove chips and grinder wheel abrasives the group is ready for lapping.

Above, in connection with Figure 5, attention was especially called to the depressions 19. If on this initial surfacing operation of the process, the elements were made much longer than needed, this first composite surface formed would be substantially continuous and one of the desirable objects of the invention would be lost. It has already been explained how a single flat surface of adequate expanse to form a guide for the application of lapping pressure is nevertheless a difficult object to lap to a high polish and keep flat as well, because of the loading of the lap with end products; and especially because this loading is not uniform over the area of the lap, but concentrates in its center. But when a composite table of surfaces of this size is broken or interrupted with a large number of evenly spaced depressions 19, the end products of the lapping operation clear themselves continuously and automatically over the whole surface of the lap and work, finding a ready outlet into the depressions 19. This interrupted working surface has the double advantage of hastening the cutting speed and securing a polished surface which is much flatter as a whole than would otherwise be possible; and results in the still further advantage of requiring a much less skillful operator to produce a comparable result.

In the preparation of such elements as 3, each element of the load is to be formed with three operating faces 16, 17, 18, Figure 3. After the first surface, which we may consider as that which will become face 18 on each of the finished elements has been completed the load of elements is removed from the fixture, and the fixture and elements are washed free of all dirt, abrasive, sludge, etc., which might interfere with the accurate nesting of the next loading.

The elements are then reloaded into the fixture for the preparation of a second surface which may, for instance, mature into faces 17. Upon reloading the elements are so arranged that upon grinding down to line 14, the surface will be disposed in proper angular relation to the already formed face 18. The grinding and finishing processes are then repeated.

Similarly the third surface 16 is prepared, and finished, thus completing the preparation of the elements of Figure 3 for final assembly in the matrix, Figure 4.

The illustration, Figures 1 and 2, shows a load of elements 3, after the three surfaces and the entire process has been completed. The third composite surface or table of surfaces to be lapped, as will be seen most clearly at 16, Figure 1, comprises a series of small squares arranged as parallel rows of contiguous diamonds. A fragment of this arrangement is shown more clearly still in the detail plan view Figure 6. The depressions, 19 are here clearly brought out as being bounded by the slanting locating faces 1 of the elements, and the completed surfaces 17 and 18 perpendicular to the plane of the paper.

It will be understood that in the first surfacing operation (also in the second to a lesser degree) there will be a larger proportion of the composite table which will have to be ground and lapped than in the third forming and surfacing operation, as the stock will not yet have been removed for the surfaces 17 and 16 yet to be formed. So long, however, as substantial depressions 19, Figure 5, are allowed for, the principal advantages of an interrupted surface are obtained in the lapping operation.

It is obvious also that all three forming surfaces 16, 17, 18 could be roughed out before the finish grinding and lapping operations are performed, in which case the appearance of the composite surface to be finished would be substantially as shown in Figure 6 for all three surfacing operations.

Figures 7 and 8 correspond to Figures 9 and 10 of Patent No. 1,591,572.

Figure 7 shows another type of element adaptable to formation in the type of apparatus illustrated in Figures 1 and 2. These elements assemble together in a matrix so that three of the elements form together the reflecting unit of a reflector matrix as shown in Figure 8 at 45. In this instance the element has four locating faces 1, forming a losinge or diamond shaped element, the faces forming acute angles of 60 degrees and obtuse angles of 120 degrees where they intersect. Two forming surfaces 43 and 44 are in this instance to be processed. The fixture is equally adaptable to the processing of the diamond shaped as well as hexagonal shaped elements.

The processing of the proper number of elements Figure 7 to form a load for the fixture, Figure 1 is exactly similar to the processing of elements 3 except that there are only two surfaces to be formed. The intersection of the inclined surfaces 43 and 44 provide depressions distributed over the table of surfaces to be lapped and thus preserving all of the advantages of the invention.

The element of Figure 9 is a variation making use of the diamond stock from which elements of Figure 7 are formed, but in this instance with only one forming surface 31. When this surface 31 is inclined at the same angle to the element axis, three such elements may be grouped together as shown in Figure 10 to form the equivalent of the element 3, Figure 3 with the surfaces 31, 32, 33 corresponding to surfaces 16, 17, 18.

Elements of Figure 9 may also be processed in the fixture and only one loading and surfacing is required to complete the element. However, since there is no intersection of forming surfaces, there is no interruption of the composite surface which each of surfaces 31 is a constituent part, and there will be no breaks or depressions in the planar table except for a series of intersecting lines formed by the joining of constituent elements. Thus one of the advantages of the invention is not fully preserved in the surfacing of this embodiment, but in all other respects the improvements as set forth in the objects of the invention are retained.

From the foregoing description it is apparent that the invention accomplishes its objects. An improved method and apparatus is provided whereby a plurality of relatively small surfaces may be finished with a high degree of accuracy; not only in the sense that the surfaces themselves may be finished very flat and with a high polish, but angularly accurate with respect to intersecting locating surfaces of the element and with respect to mutually intersecting forming surfaces of the element as well. By arranging the surfaces to be treated in surface relation a guide is provided for the equalized application of lapping pressure; intervening cavities or interruptions between the respective small surfaces according to some embodiments provides a corrective for many of the difficulties heretofore common to the accurate lapping of highly finished surfaces; an apparatus and method is devised for surfacing a large number of elements through all the necessary states of the process without the necessity of handling the elements except as a group; unusual and heretofore unattainable accuracy of angular relationship between all of the surfaces comprising the elements and between finally assembled elements is provided by grouping the elements for finishing wherein the same factors of location are utilized in the apparatus for finishing which are later employed in the apparatus of use.

It will be understood that the particular embodiments described are simply illustrative and that many modifications will present themselves to those skilled in the art. For the purpose of indicating the flexibility of the process, various types of elements capable of being processed in the one particular apparatus chosen for illustration have been described, but it is evident that the process of this invention is susceptible of use in the forming of other types of elements than those specifically referred to hereinbefore. It will be plain that suitable modifications of apparatus may be made to make possible the surfacing of many types of elements having all or part of the desired characteristics, and coming within the scope of the invention. It is to be distinctly understood, therefore, that the invention is not limited to the specific details which have been set forth hereinbefore. Furthermore, it is to be understood that such modifications and the use of such individual features and sub-combinations of features as do not depart from the spirit of the invention are, although not specifically described herein, contemplated by and within the scope of the appended claims.

Having thus described the invention, what is claimed is:

1. An apparatus for holding elements designed for assembly in mutual engagement to present active cooperating faces, comprising, a support in which the elements are assembled with their locating faces in mutual engagement, means engaging the assembly of elements adapted to present the areas of their active faces to be formed in a surface relation, and means for securing the assembly so presented to permit working on that surface adapted to apply clamping pressure in a plurality of different directions.

2. An apparatus for holding elements designed for assembly in mutual engagement to present active cooperating faces, comprising, a support in which the elements are assembled with their locating faces in mutual engagement, a member having a plurality of walls engaged by the marginal elements of the assembly adapted to position the elements with the areas of their active faces to be formed in a surface relation and to support the same against displacement in different directions, and means for securing the assembly so positioned adapted to maintain the assembly in firm engagement with said walls to permit working on that surface.

3. An apparatus for holding elements designed for assembly in mutual engagement to present active cooperating faces, comprising, a support in which the elements are assembled with their locating faces in mutual engagement, a member having a plurality of inclined walls engaged by the marginal elements of the assembly adapted to position the elements at an incline with the areas of their active faces to be formed in a surface relation and to support the same against displacement in different directions, and means for clamping the assembly against said walls so as to secure the same so positioned to permit working on that surface.

4. An apparatus for holding elements designed for assembly in mutual engagement to present active cooperating faces, comprising, a support in which the elements are assembled with their locating faces in mutual engagement, a structure having a plurality of disalined walls surrounding the assembly and engaged by the marginal elements thereof adapted to position the elements with the areas of their active faces to be formed in a surface relation, and means for clamping the assembly against a plurality of said walls in order to secure the same so positioned to permit working on that surface.

5. An apparatus for holding elements designed for assembly in mutual engagement to present active cooperating faces, comprising, a support in which the elements are assembled with their locating faces in mutual engagement, a structure having a plurality of disalined inclined walls surrounding the assembly and engaged by the marginal elements thereof adapted to position the elements at an incline with the areas of their active faces to be formed in a surface relation, and means for clamping the assembly against a plurality of said walls in order to secure the same so positioned to permit working on that surface.

6. An apparatus for holding elements designed for assembly in mutual engagement to present active cooperating faces, comprising a support on which the elements are assembled with their locating faces in mutual engagement, means on said support providing a socket adapted to receive the assembly and to position the elements thereof to present the areas of their active faces to be formed in a surface relation, and means for clamping the assembly in said socket adapted to apply clamping pressure in a plurality of different directions.

7. An apparatus for holding elements designed for assembly in mutual engagement to present active cooperating faces, comprising, a support on which the elements are assembled with their locating faces in mutual engagement, means on said support providing a socket adapted to receive the assembly and to position the elements thereof to present the areas of their active faces to be formed in a surface relation, and means for clamping the assembly in said socket, said clamping means providing a cooperating socket whereby the elements are clamped together in different directions.

JONATHAN C. STIMSON.